United States Patent [19]

Kim

[11] Patent Number: 5,450,265

[45] Date of Patent: Sep. 12, 1995

[54] TAPE CLEANING APPARATUS OF A TAPE RECORDER USING TAPEGUIDE MECHANISM DURING RECORD AND PLAYBACK MODE

[75] Inventor: Un-bae Kim, Seongnam, Rep. of Korea

[73] Assignee: Samsung Electronics Co., Ltd., Kyungki, Rep. of Korea

[21] Appl. No.: 171,627

[22] Filed: Dec. 22, 1993

[30] Foreign Application Priority Data

Dec. 24, 1992 [KR] Rep. of Korea .................... 92-26362

[51] Int. Cl.⁶ ..................... G11B 5/00; B08B 11/02
[52] U.S. Cl. ................. 360/137; 360/130.32; 15/100; 15/DIG. 13
[58] Field of Search ................. 360/137, 138, 130.21, 360/130.22, 130.23, 130.31–130.32; 15/DIG. 13, 93.1, 97.1, 100, 210, 256.5, 308, 309.1

[56] References Cited

U.S. PATENT DOCUMENTS

| | | | |
|---|---|---|---|
| 3,872,510 | 3/1975 | Childress, Jr. et al. | 360/137 |
| 4,257,079 | 3/1981 | Yoshizawa | 15/100 |
| 4,637,088 | 1/1987 | Badaracco et al. | 360/137 |
| 4,930,033 | 5/1990 | Pergerson | 360/137 |
| 4,970,748 | 11/1990 | Rubey | 15/97.1 |
| 5,048,142 | 9/1991 | Stone | 15/97.1 |

FOREIGN PATENT DOCUMENTS 2460973  6/1976  Germany ..................... 15/DIG. 13

*Primary Examiner*—Stuart S. Levy
*Assistant Examiner*—Brian E. Miller
*Attorney, Agent, or Firm*—Sughrue, Mion, Zinn, Macpeak & Seas

[57] ABSTRACT

A tape cleaning apparatus for a tape recorder includes a cleaning member fixed on one side of the tape running path and a cleaning roller for pressing the tape toward the cleaning member. The tape recorder adopting such cleaning apparatus can remove foreign matter attached to the tape, so as to improve the running performance of the tape and prevent damage to the tape.

6 Claims, 4 Drawing Sheets

TAPE CLEANING APPARATUS OF A TAPE RECORDER USING TAPEGUIDE MECHANISM DURING RECORD AND PLAYBACK MODE

BACKGROUND OF THE INVENTION

The present invention relates to a tape cleaning apparatus of a tape recorder/reproducer (herein after "tape recorder"), and more particularly to a tape cleaning apparatus a tape recorder for removing foreign matter which is attached to the tape surface by means of an electrostatic force produced when the tape is guided by a guide mechanism during recording/reproduction.

Generally, when a tape cassette is installed and used in a tape recorder, the tape is drawn from the cassette by a tape guiding mechanism and positioned to make contact with a head drum. The tape is caused to move in one direction by means of the pressing action of a pinch roller and capstan motor shaft. Also, while the head drum rotates, information is read out from or recorded onto the tape.

When, when the tape is guided by a guiding mechanism and subsequently wound, an electrostatic force is generated due to tile friction between the tape and the guiding mechanism. Therefore, dust or foreign matter, which exists in the environment, tends to attach to the tape. The attachment of such foreign matter onto the tape causes the foreign matter to attach to the head drum causing damage to the head and reducing the quality of the signal read or reproduced. Also, when foreign matter becomes attached to the tape, the friction between the tape and the guiding mechanism damages the tape and introduces instability to tile tape transport, thereby resulting in jitter.

Referring to FIG. 5, a conventional apparatus has a sponge roller 201 installed near one side of head drum 200. The sponge roller 201 rotates while in contact with the head drum 200, so that the foreign matter attached to the head can be cleaned therefrom. However, the sponge roller in the conventional apparatus merely removes the foreign matter attached to the head and does not remove the foreign matter attached to the tape.

SUMMARY OF THE INVENTION

To solve the problem, it is an object of the present invention to provide in a tape recorder a tape cleaning apparatus, which is installed within the tape recorder and removes foreign matter attached to the tape while the tape recorder is in a recording/reproduction mode.

To accomplish the above object, the present invention provides a tape cleaning apparatus, which comprises tape cleaning means including a cleaning member which is in contact with one side of the tape and located along the running path of the tape.

BRIEF DESCRIPTION OF THE DRAWINGS

The above objects and other advantages of the present invention will become more apparent after a detailed description of a preferred embodiment with reference to the attached drawings in which.

Detailed Description of the Invention

Figure 1:
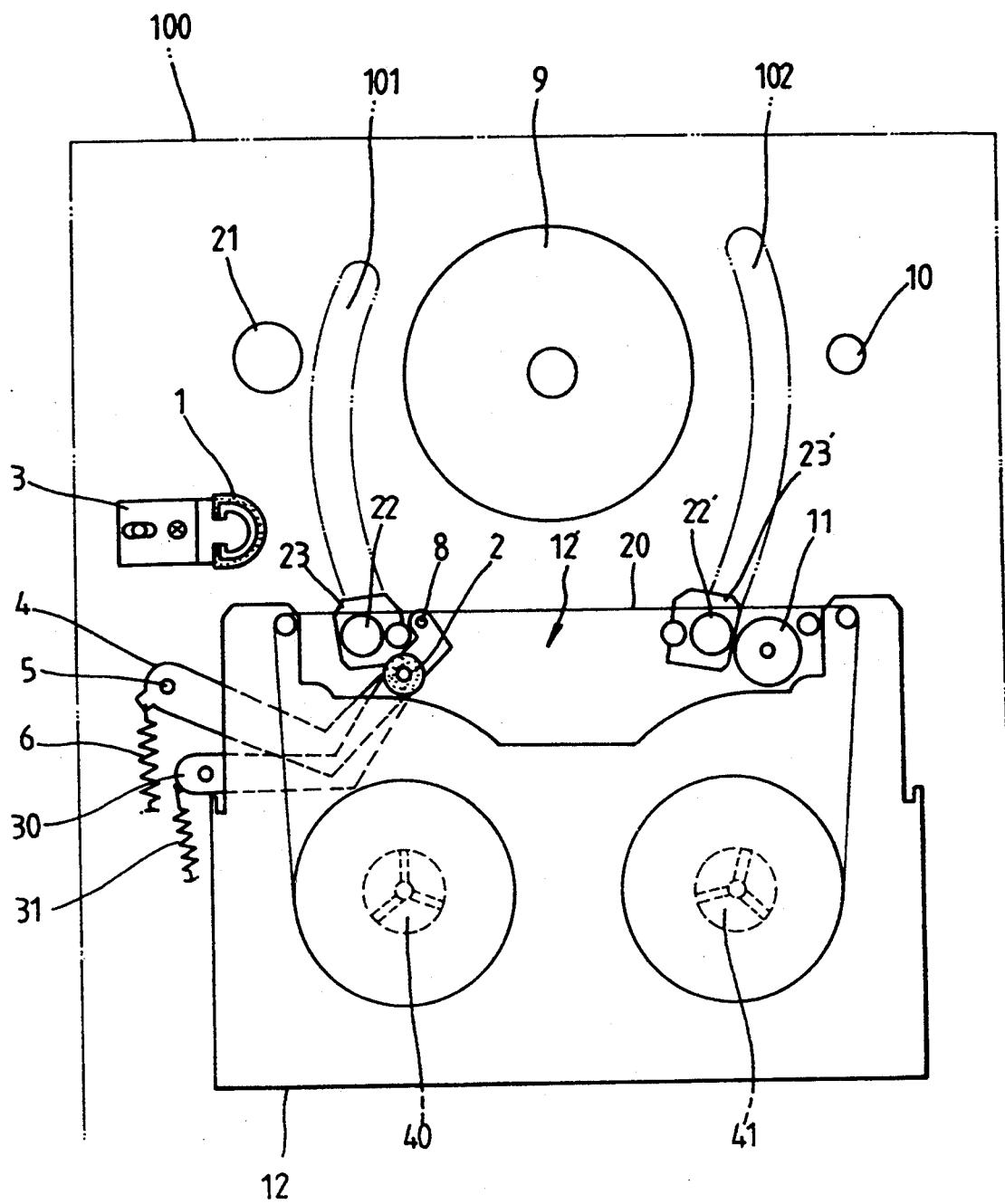
FIG. 1 is a schematic diagram showing the operation of the cleaning apparatus according to the present invention, before the tape is loaded.
Figure 2:
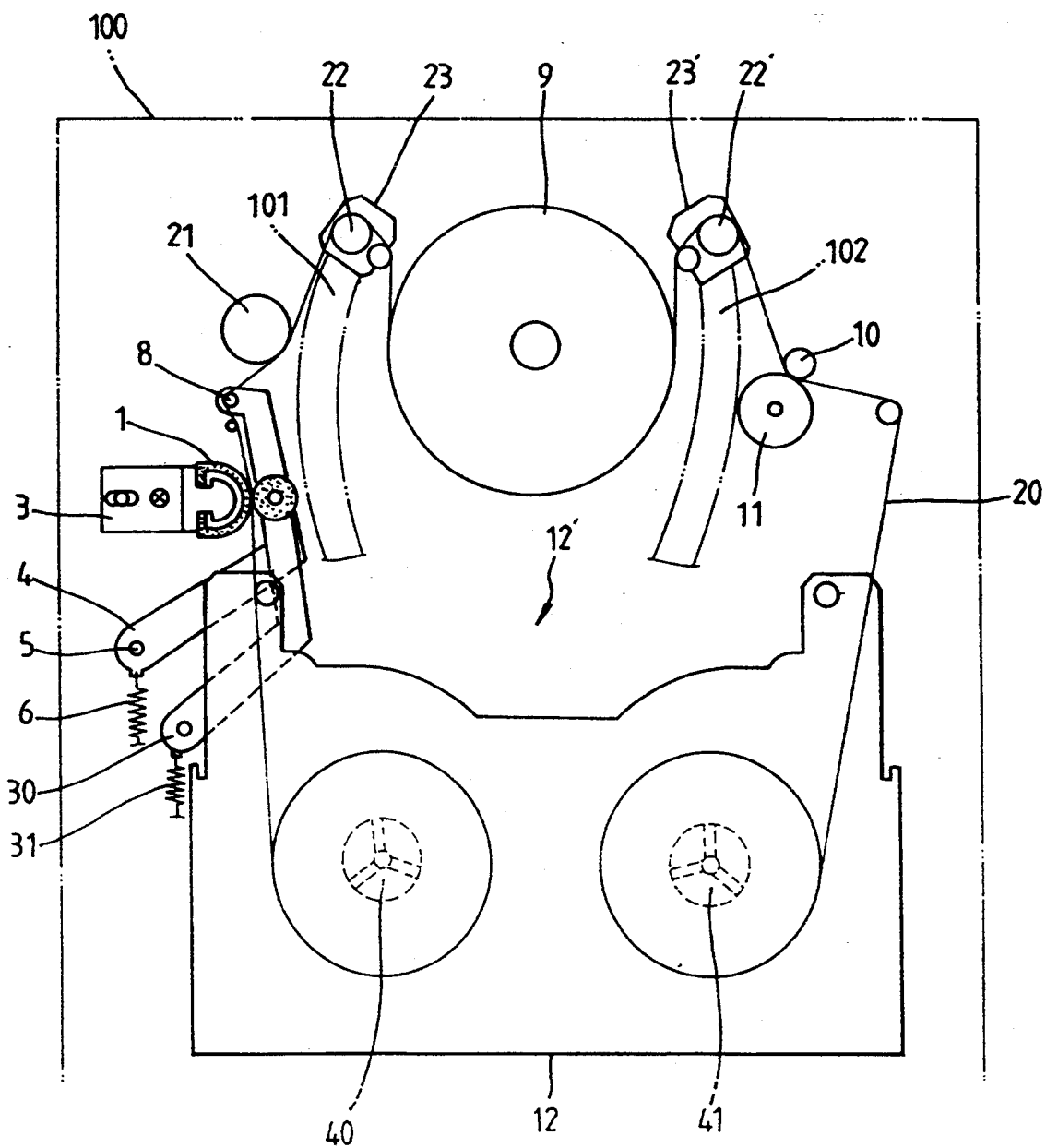
FIG. 2 is a schematic diagram showing the operation of the cleaning apparatus according to the present invention, when the tape is loaded.

FIGS. 1 and 2 illustrate a tape recorder having a tape cleaning apparatus according to the present invention. FIG. 1 shows the operation of the cleaning apparatus according to the present invention, where a tape 20 is not drawn from a cassette 12. FIG. 2 shows the operation of the cleaning apparatus according to the present invention, where tape 12 is drawn from cassette 20.

Referring to FIG. 1, cassette tape 12 rests on tape reels 40 and 41. Guide poles 22 and 22' and a tension pole 8 controlling the tension during tape running constitute the tape guiding mechanism of the tape recorder and are relatively positioned within a tape drawing portion 12' of cassette 12 for drawing and guiding the tape 20. Guide poles 22 and 22' are installed at pole bases 23 and 23' which move along guide grooves 101 and 102, respectively, formed in deck 100. Tension pole 8 is installed at one end of lever 4, which is rotatably supported by pin 5 on a deck 100. Also, lever 4 is resiliently biased counterclockwise by means of a spring 6 at the other end thereof. A guide roller 21 for guiding tape 20 and a capstan motor shaft 10 are installed near head drum 9 on deck 100, and a pinch roller 11 is installed for pressing tape 20 toward capstan motor shaft 10 to thereby transport the tape.

The tape cleaning apparatus according to the present invention is established along the tape running path 20.

The cleaning apparatus comprises a cleaning member 1 installed on deck 100 and contacting the record surface of tape 20 when tape 20 is pulled out and a cleaning roller 2 capable of moving toward cleaning member 1 and resiliently contacting the opposite side of the tape. Cleaning roller 2 can be made of sponge, rubber or any other similar material.

Figure 3:
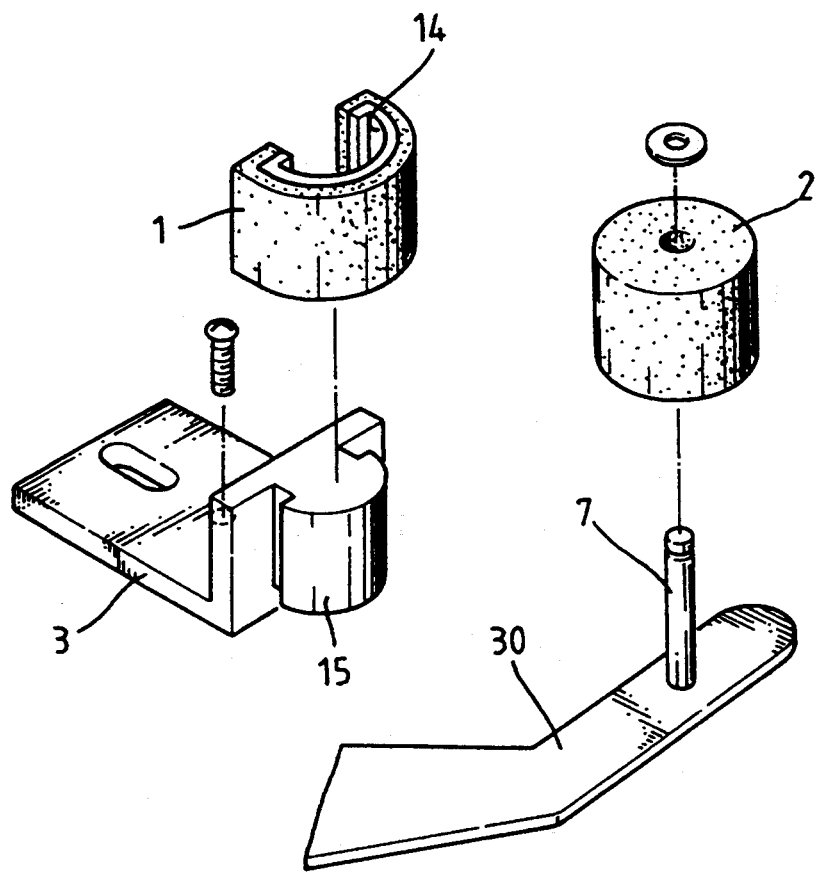
FIG. 3 is a perspective view of the cleaning apparatus according to the present invention.

Cleaning member 1 can be made of cloth or sponge and is coupled with a cap 14, shown in FIG. 3. Cap 14 can be coupled with a coupler 15 of a fixing plate 3, which is secured on deck 100.

Lever 4 is blocked by pole base 23 from moving counterclockwise. When pole base 23 moves, lever 4 is free to rotate counterclockwise due to the restoring force of spring 6. Also, cleaning roller 2 is installed on a roller lever 30 which is resiliently biased by means of spring 31. Cleaning roller 2 is blocked by pole base 23 from moving counterclockwise in the same manner as lever 4 but rotates counterclockwise when the pole base 23 moves upward, thereby contacting cleaning member 1. As seen in FIG. 3, cleaning roller 2 is rotatably fixed to a post 7 near the end of lever 30.

Next the operation of the cleaning apparatus of the tape recorder according to the present invention will be described.

Firstly, as shown in FIG. 1, when tape 20 is not yet drawn out of cassette 12, guide poles 22 and 22' for drawing tape 20 towards head drum 9, tension pole 8 for controlling the tension of the currently running tape, and a cleaning roller 2 are located within a tape drawing portion 12' of tape cassette 12.

Figure 4:
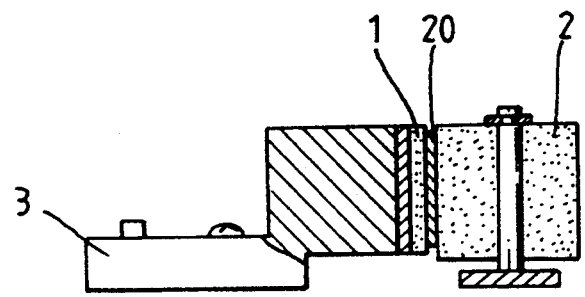
FIG. 4 is a sectional view of the cleaning apparatus according to the present invention and FIG. 5 is a perspective view of a conventional apparatus.
Figure 5:
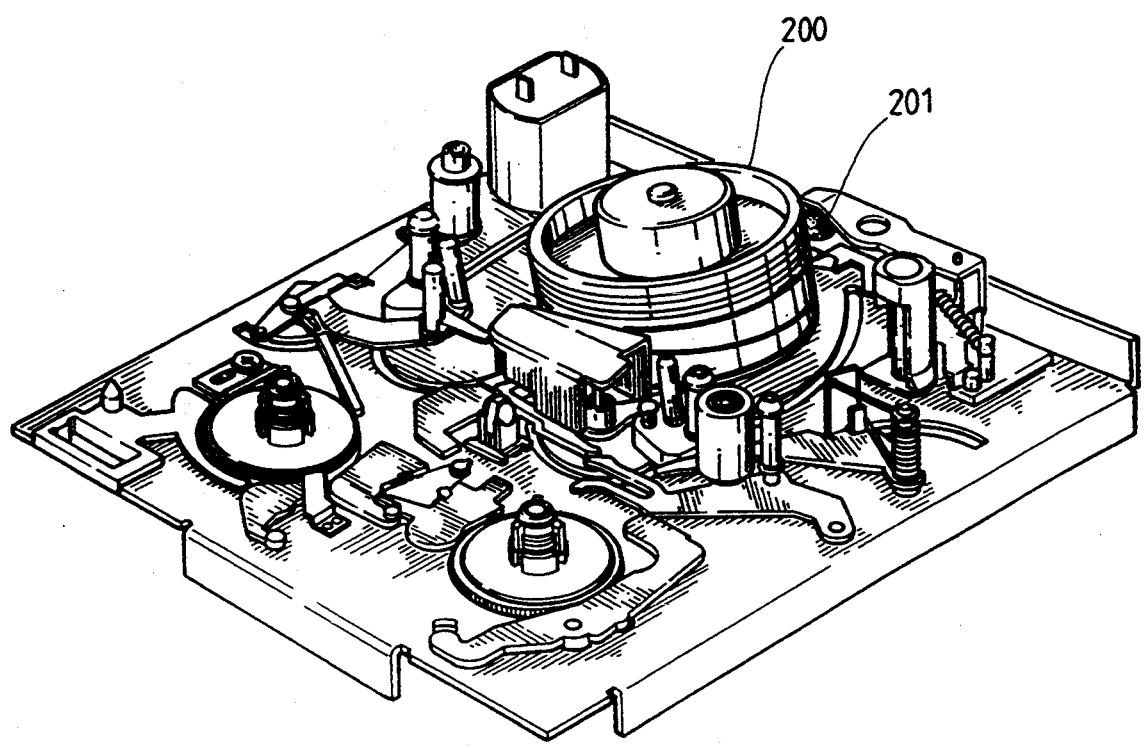

Next, as shown in FIG. 2, when tape 20 is drawn out of tape cassette 12 by means of guide poles 22 and 22' and loaded toward head drum 9, tension pole 8, located on one end of lever 4, rotates due to the restoring force of spring 6 and provides the tape with a predetermined tensional force. Cleaning roller 2, on lever 30, also rotates and comes into contact with cleaning member 1. At this time, tape 20 runs between cleaning member 1 and cleaning roller 2, as shown in FIG. 2 and FIG. 4. The closeness of cleaning member 1 and cleaning roller 2 should be properly controlled so as not to overly press the tape while running.

The above constructed cleaning apparatus of the tape recorder can remove the foreign matter which become attached to tape 20 due to the static electricity caused by the friction between tape and tape guiding mechanism during the tape traveling, using cleaning member 1 and cleaning roller 2 both installed on the tape running path.

Accordingly, cleaning apparatus according to the present invention not only prevents the head of the head drum from being damaged due to foreign matter but also enables the head to read or record the signal without impairment by the foreign matter. Also, the apparatus can prevent tape damage which occurs due to the friction between the unclean tape and guiding mechanism. Furthermore, jitter which is caused by unstable tape running due to the foreign matter located between the tape guiding mechanism and tape can be eliminated.

As described above, the tape recorder having the cleaning apparatus according to the present invention removes/foreign matter on the tape surface so that the tape running performance can be improved and a higher quality output can be produced.

As a matter of course, it goes without saying that anyone skilled in the art can perform a variety of modifications other than the above described embodiment without escaping from the scope of the present invention. For example, although the cleaning apparatus is installed only on the left side of head drum 9 and along the tape running path, the apparatus can also be installed on the right side of head drum 9. Also, although cleaning 2 is installed on a separate roller lever 30, the roller can be installed on lever 4 supporting pole 8, thereby eliminating the need of additional lever 30.

What is claimed is:

1. In a tape recorder apparatus of the type having a deck, tape guide means for guiding a tape from a tape cassette and positioning said tape on a head drum, a first lever rotatably supported on said deck and having a tension pole disposed thereon for tensioning said tape, and a tape cleaning mechanism installed in said tape recorder, said tape cleaning mechanism comprising:

a first cleaning member fixedly disposed on said deck and positioned in the running path of said tape as determined by said tape guide means and said tension pole;

a movable cleaning member comprising a second lever rotatably supported near said first lever on said deck, a cleaning roller attached near one end of said second lever, and restorative biasing means for biasing said second lever to rotate in a direction to move said roller to a position in contact with said first cleaning member, wherein said movable cleaning member is positioned to move along an arcuate path solely by said restorative biasing means when said tape is loaded onto said head drum to said position placing said tape between said first cleaning member and said cleaning roller; and a pole base, supporting said guide means, for preventing said movable cleaning member from moving under the influence of said biasing means when said guide means has not moved to guide said tape onto said head drum, wherein said movable cleaning member moves along said arcuate path when said guide means positions said tape on said head drum.

2. The invention of claim 1, wherein said first cleaning member is made of cloth, sponge, or sponge-like cleaning material, and said cleaning roller is made of sponge, sponge-like, or rubber cleaning material.

3. The invention of claim 2, wherein said first lever is separate from said second lever on which said cleaning roller is attached.

4. The invention of claim 2, wherein said tension pole is fixed to said second lever to which said cleaning roller is attached.

5. A tape cleaning apparatus for a tape recorder as claimed in claim 2, wherein said first cleaning member contacts the recording surface of said tape.

6. A tape cleaning apparatus for a tape recorder as claimed in claim 1, wherein said first cleaning member contacts the recording surface of said tape.

* * * * *